No. 858,877. PATENTED JULY 2, 1907.
F. E. LA FERTE.
ARTIFICIAL PAW.
APPLICATION FILED JAN. 8, 1907.

Witnesses: Harry L. Gaither, Ruby V. Nash.

Inventor: Frank E. La Ferte
by Lambuth & Wiltman
his Attorneys

UNITED STATES PATENT OFFICE.

FRANK E. LA FERTE, OF CHICAGO, ILLINOIS.

ARTIFICIAL PAW.

No. 858,877.   Specification of Letters Patent.   Patented July 2, 1907.

Application filed January 8, 1907. Serial No. 351,313.

*To all whom it may concern:*

Be it known that I, FRANK E. LA FERTE, a citizen of the United States, residing at Chicago, county of Cook, State of Illinois, have invented a certain new and useful Improvement in Artificial Paws; and I declare the following to be a full, clear, and exact description of the same, such as will enable others skilled in the art to which it pertains to make and use the same, reference being had to the accompanying drawings, which form a part of this specification.

My invention relates in general to the manufacture of articles of wearing apparel from natural fur, and more particularly to an artificial claw for use in making imitation animal paws.
It is usual in removing the skins from animals to cut off the paws. It is therefore necessary to make imitation paws in order that articles made from furs may be ornamented with paws. It is customary to make imitation paws by folding a strip of fur into the desired shape and sewing artificial claws having holes in them, in proper positions to resemble the natural paws. The operation of sewing the claws to the imitation paws is slow and unsatisfactory as it is difficult to locate and retain the claws in proper positions.
The primary object of my invention is to provide an artificial claw for use in making imitation animal paws, which may be easily and securely attached to the imitation paw and will be retained in proper position without the necessity of sewing the claw in position.
A further object of my invention is to provide an artificial claw for use in making imitation paws, which will be simple in construction, inexpensive in manufacture, and efficient in use.

My invention may be generally described as consisting in a claw comprising a pointed curved portion corresponding in appearance to the natural claw of an animal, and a head secured to the larger end of the curved portion so that when the curved portion is forced through the skin of which the paw is to be made, the head will underlie the skin and prevent the claw from becoming disengaged.

Figure 1:
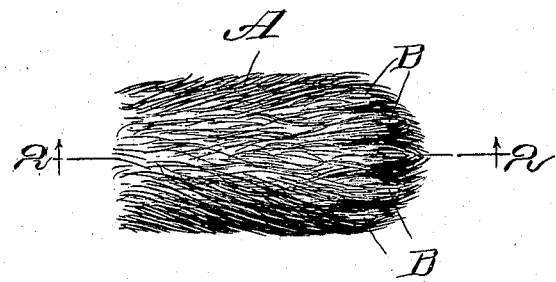
Figure 2:
Figure 3:
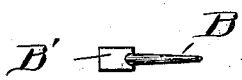
Figure 4:
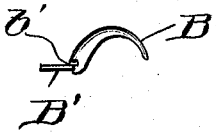

My invention will be more fully described hereinafter with reference to the accompanying drawing in which the same is illustrated as embodied in a convenient and practical form, and in which Figure 1 is a plan view of an imitation animal's paw; Fig. 2 a sectional view on line 2—2 Fig. 1 through the top of the paw; Fig. 3 a plan view of a claw detached from the paw; and Fig. 4 a side elevational view of the claw.

The same reference characters are used to designate the same parts in the several figures of the drawing.

Reference character A designates an imitation animal's paw made from a strip of fur folded and sewed into shape resembling the natural paw of an animal.

*a* designates the skin or hide of the fur.

B designates my improved artificial claw which comprises a pointed curved portion of a size and shape corresponding to a natural claw of an animal.

B′ indicates a head secured to the larger end of the curved portion of the claw and adapted to underlie the skin *a* when the pointed curved portion is forced through the skin. The head B′ extends at an angle from the curved portion so that when it engages the under-surface of the skin the curved portion will occupy a position relatively to the imitation paw corresponding to the position of a natural claw.

In order that after the curved portion of the claw has been forced through the skin it may be retained in such position and prevented from being forced backwardly through the skin, I provide a notch *b′* adjacent the upper surface of the head B′, such notch serving to receive the adjacent edge of the skin after the curved portion has been forced therethrough. The skin is sufficiently resilient to engage the notch *b′* after the curved portion has been forced through the skin. After the desired number of claws have been inserted through the skin of a strip of fur, the strip is folded and sewed into a size and shape corresponding to a natural paw.

From the foregoing description it will be observed that I have invented an artificial claw for use in making imitation animal paws which may be readily secured in proper position and will be retained in such position without the necessity of sewing the claw in position.

Having now fully described my invention, what I claim as new and desire to secure by Letters Patent is:

1. As an article of manufacture, an artificial claw having formed at one end means for gripping the claw to the skin of a piece of fur.

2. As an article of manufacture, an artificial claw having formed at one end a head adapted to engage the skin of a piece of fur and grip the claw thereto.

3. An artificial claw for use in making imitation animal paws comprising a pointed portion adapted to be forced through the skin of a piece of fur, a head adapted to underlie the skin and retain the pointed portion in a natural position in the fur, and a notch above the head to receive the edge of the skin adjacent the hole through which the pointed portion extends.

4. An artificial claw for use in making imitation animal paws, comprising a pointed portion adapted to be forced through the skin of a piece of fur, a head extending in an inclined direction from one end of the pointed portion adapted to underlie the skin, and a notch above the head to receive the edge of the skin adjacent the hole through which the pointed portion extends, thereby retaining the curved portion in a natural position in the fur.

5. An artificial claw for use in making imitation animal paws, comprising a pointed curved portion adapted to be forced through the skin of a piece of fur, a head having a flat upper surface extending in an inclined direction from the larger end of the curved portion adapted to underlie the skin and retain the curved portion in a natural position in the fur and means for preventing the claw from being disengaged from the skin.

6. In an imitation animal paw, the combination with a piece of fur sewed to resemble a natural paw, of a plurality of separated artificial claws each comprising a curved pointed portion extending through and lying above the skin of the fur and a head underlying the skin of the fur and securing the curved portion to the fur in a natural position.

7. In an imitation animal paw, the combination of a fur skin in the shape of a paw and a plurality of artificial claws extending through the skin and having integral fastening devices thereon for gripping the claws to the skin.

8. An imitation animal paw, consisting of a piece of fur skin in the shape of a paw, and a plurality of artificial claws projecting through the skin and having heads thereon arranged to grip the claws to the skin.

9. In an imitation animal paw, the combination of a fur skin in the shape of a paw and a plurality of individual artificial claws each having at one end a narrow flat portion adapted to engage with the skin, and means coöperating with each of said flat portions for holding the claws in place independently of each other.

10. In an imitation animal paw, the combination with a fur skin having attached thereto a plurality of independent artificial claws which project at one end beyond the end of the paw and underlie the skin of the paw at their other ends and means for securing each of said claws in place independently of the other claws.

11. In an imitation animal paw, the combination with a fur skin, of a plurality of individual claws distributed beneath the skin of the paw and projecting at their one end beyond the end of the paw, and means for securing each of said claws in place independently of the other claws.

In testimony whereof, I sign this specification in the presence of two witnesses.

FRANK E. LA FERTE.

Witnesses:
GEO. L. WILKINSON,
HARRY S. GAITHER.